UNITED STATES PATENT OFFICE.

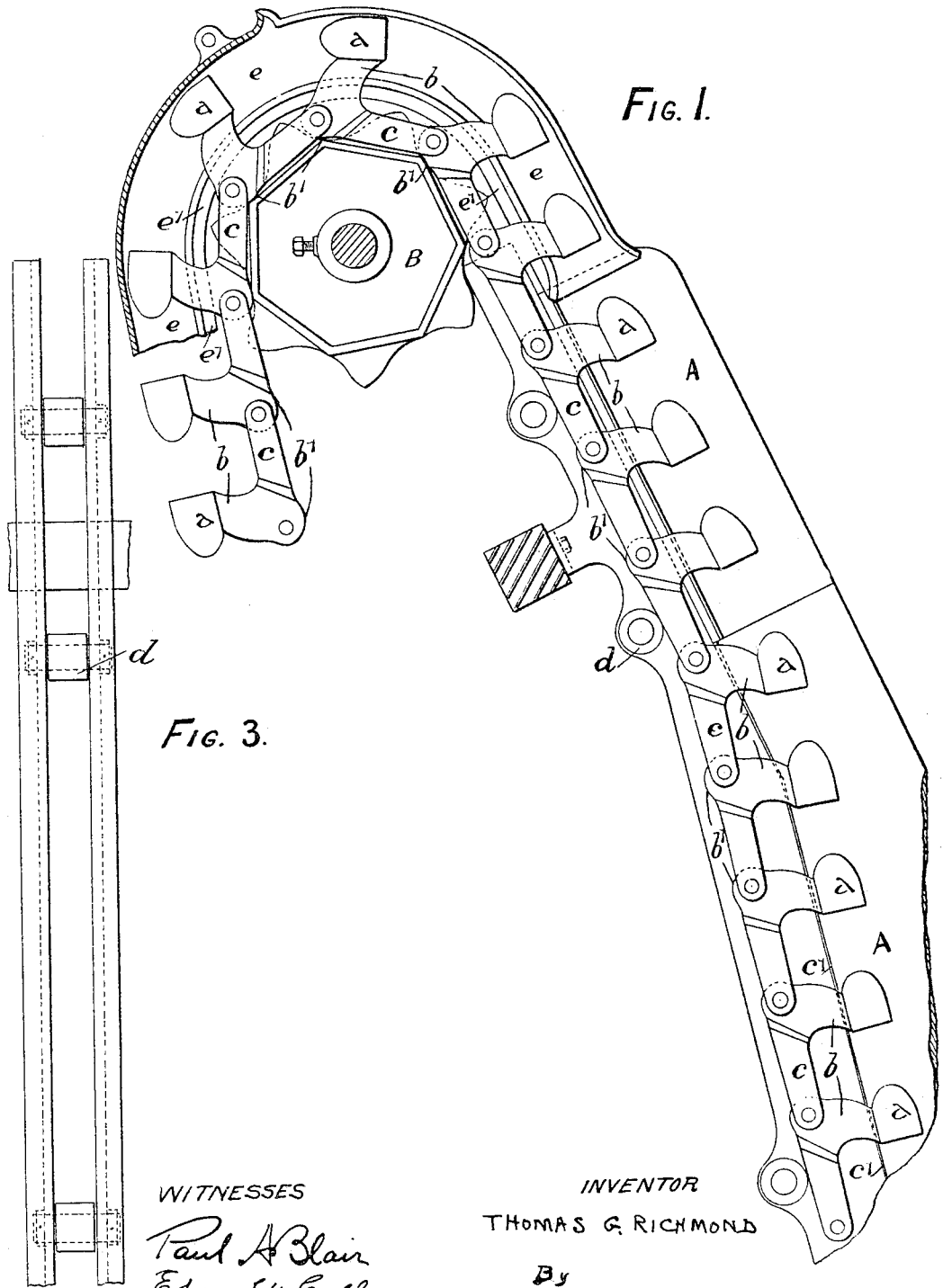

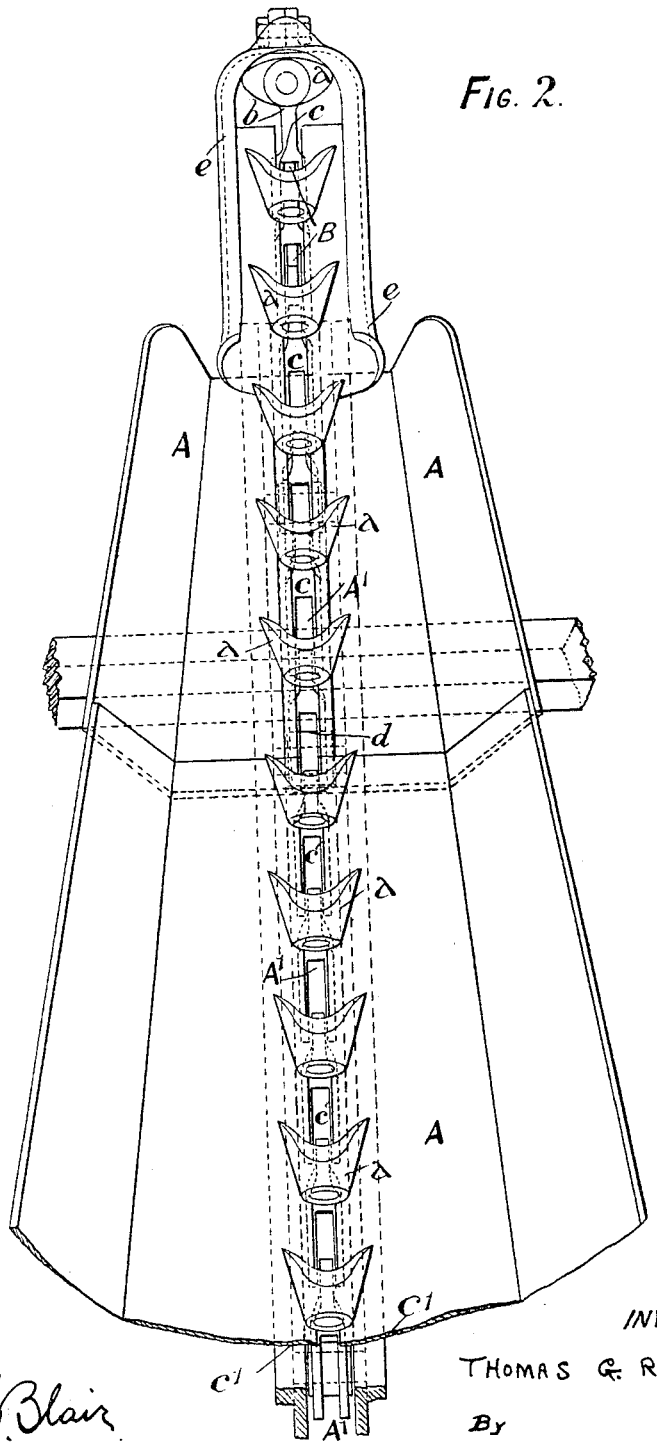

THOMAS GORDON RICHMOND, OF DRON, SCOTLAND.

MACHINE FOR PLANTING POTATOES AND THE LIKE.

No. 798,980.      Specification of Letters Patent.      Patented Sept. 5, 1905.

Application filed June 6, 1905. Serial No. 264,011.

*To all whom it may concern:*

Be it known that I, THOMAS GORDON RICHMOND, farmer, a subject of the King of Great Britain and Ireland, and a resident of Dron, Bridge of Earn, county of Perth, Scotland, have invented certain new and useful Improvements in Machines for Planting Potatoes and the Like, of which the following is a specification, and for which an application for a patent has been filed in Great Britain, No. 13,996, bearing the date June 21, 1904.

This invention has reference to improvements in machines for planting potatoes and the like of the class in which an endless chain of buckets picks up the potato-seed from a hopper and carries and tilts them into a tubular chute, from whence they are delivered at regulated spaced distances apart into the drill being formed.

In the accompanying drawings, Figure 1 represents a side elevation, partly in section, of the upper part of the hopper and the delivery-tube of an apparatus embodying my invention. Fig. 2 represents an elevation, partly in section, looking at the right of Fig. 1; and Fig. 3 represents a detached view of the frame corresponding with Fig. 2, but with the buckets and iron plates removed.

By my improvements I form each carrier-bucket $a$ of an open two-jaw shape, widest at the top part and tapering downward toward the center. These buckets $a$ would be attached at spaced distances apart to an endless traveling chain $c$ and would have a rib $b$ formed on the side next the chain, which would run and be guided in a groove $A'$ in the side of hopper $A$, the buckets $a$ protruding into hopper, the chain $c$ being covered in with iron plates $c'$, but leaving room for rib $b$, and the opposite side of bucket would preferably have its open center part carried down deeper than the open center part next to rib $b$, and this formation of bucket will automatically select its own potato and discard the remaining potatoes in hopper $A$. The endles chain $c$ would pass over a loose pulley-wheel $d$ at curved part of hopper $A$, so that the buckets $a$ by changing their direction would receive a "tip," thus removing any potatoes other than the one actually in each bucket. The discarded potatoes would fall back into the hopper $A$, the rib $b$ and buckets $a$ now protruding far enough to allow of this. The upper part of delivery tubular chute $e$ would preferably only extend past the vertical center line, where the potatoes would be tipped into same from the buckets $a$, the other part of tube $e$ being open on top, and the inner side of the tube $e$ would be formed with a flange $e'$ for the chain $c$ to bear on after it has left the toothed wheel B, and by this means the buckets $a$ are prevented from getting worn by frictional contact against the tube.

Having now described my invention, what I claim as new, and desire to secure by Letters Patent, is—

1. In a potato-planting machine, an endless chain, and buckets attached to the links of said chain, in combination with a projecting rib between the buckets and the chain-links.

2. In a potato-planting machine, an endless chain, buckets attached to the links of said chain, said buckets having an open two-jaw shape, and projecting ribs between said buckets and the links of said chain.

3. In a potato-planting machine, an endless chain, buckets attached to the links of said chain, and projecting ribs between said buckets and said links, in combination with a hopper, metallic plates therein having a space between them for the said ribs to pass.

4. In a potato-planting machine, an endless chain, buckets thereon and a hopper having an inclined side up which said chain travels, in combination with a roller to act on said chain to remove any potatoes other than the one actually in each bucket.

5. In a potato-planting machine, a hopper, and an endless chain, with buckets thereon passing from the hopper, in combination with means to remove any potatoes other than the one actually in each bucket.

In testimony whereof I have signed my name to this specification in the presence of two subscribing witnesses.

THOMAS GORDON RICHMOND.

Witnesses:
     WALTER BAXTER,
     ALLAN BAXTER.